(12) United States Patent
Huang et al.

(10) Patent No.: US 12,053,956 B2
(45) Date of Patent: Aug. 6, 2024

(54) POLYMER FILM AND USES OF THE SAME

(71) Applicant: Chang Chun Petrochemical Co., Ltd., Taipei (TW)

(72) Inventors: Tzu-Jung Huang, Taipei (TW); Yen-Chen Huang, Taipei (TW); Cheng-Fan Wang, Taipei (TW)

(73) Assignee: Chang Chun Petrochemical Co., Ltd., Taipei (TW)

( * ) Notice: Subject to any disclaimer, the term of this patent is extended or adjusted under 35 U.S.C. 154(b) by 0 days.

(21) Appl. No.: 18/172,784

(22) Filed: Feb. 22, 2023

(65) Prior Publication Data
US 2023/0415461 A1    Dec. 28, 2023

(30) Foreign Application Priority Data

Jun. 28, 2022  (CN) .......................... 202210738983.3
Jun. 28, 2022  (TW) ................................. 111124092

(51) Int. Cl.
*B32B 17/10*        (2006.01)

(52) U.S. Cl.
CPC .. *B32B 17/10761* (2013.01); *B32B 17/10055* (2013.01); *B32B 17/10605* (2013.01); *B32B 2329/06* (2013.01)

(58) Field of Classification Search
CPC ........ B32B 17/10761; B32B 17/10605; B32B 17/10055
USPC ....................................................... 428/156
See application file for complete search history.

(56) References Cited

U.S. PATENT DOCUMENTS

| | | | |
|---|---|---|---|
| 2018/0239066 A1* | 8/2018 | Tachibana | G02B 5/0858 |
| 2018/0326696 A1 | 11/2018 | Muguruma et al. | |
| 2021/0162718 A1 | 6/2021 | Huang et al. | |
| 2021/0163697 A1 | 6/2021 | Huang et al. | |
| 2022/0134705 A1* | 5/2022 | Kim | B29C 45/16 |
| | | | 264/255 |
| 2022/0161515 A1* | 5/2022 | Kim | C09J 7/10 |
| 2022/0411153 A1* | 12/2022 | Nagai | B32B 27/36 |

FOREIGN PATENT DOCUMENTS

| | | |
|---|---|---|
| CN | 113631384 A | 11/2021 |
| JP | 2018-187929 A | 11/2018 |
| JP | 2021-084854 A | 6/2021 |
| JP | 2021-084855 A | 6/2021 |
| KR | 10-2021-0068298 A | 6/2021 |
| KR | 10-2021-0071208 A | 6/2021 |
| TW | 202124127 A | 7/2021 |
| WO | WO 2021/029620 A1 | 2/2021 |
| WO | WO 2021/054639 A1 | 3/2021 |
| WO | WO 2021/066518 A1 | 4/2021 |
| WO | WO 2021/096085 A1 | 5/2021 |
| WO | WO-2021100672 A1 * | 5/2021 ............. B32B 27/08 |

* cited by examiner

*Primary Examiner* — Tahseen Khan
(74) *Attorney, Agent, or Firm* — Christensen, Fonder, Dardi & Herbert PLLC

(57) ABSTRACT

Polymer film and laminated glass manufactured using the polymer film are provided. The polymer film has a first surface and a second surface, wherein the first surface has a peak material volume (Vmp) at a material ratio of 10% ranging from 0.15 $\mu m^3/\mu m^2$ to 1.20 $\mu m^3/\mu m^2$ and a kurtosis (Sku) ranging from 0.73 to 10.02, wherein the material ratio, peak material volume, and kurtosis are defined in accordance with ISO 25178-2:2012.

14 Claims, No Drawings

POLYMER FILM AND USES OF THE SAME

CLAIM FOR PRIORITY

This application claims the benefit of Taiwan Patent Application No. 111124092 filed on Jun. 28, 2022 and the benefit of China Patent Application No. 202210738983.3 filed on Jun. 28, 2022, the subject matters of which are incorporated herein in their entirety by reference.

BACKGROUND OF THE INVENTION

Field of the Invention

The present invention relates to a polymer film, specifically a polymer film with a specific peak material volume (Vmp) and kurtosis (Sku). The present invention also relates to laminated glass manufactured by using the polymer film.

Descriptions of the Related Art

Laminated glass is a glass material with a composite structure formed by interposing a polymer film between two glass sheets and performing hot-pressing to bond the glass sheets and the polymer film together. Since laminated glass has superior impact resistance and acoustic insulation property, it is widely used in the automobile and building industries.

Since the manufacturing process of laminated glass involves the hot-pressing of glass sheets and a polymer film, to avoid leaving air in the laminated glass and between the glass sheets and polymer film, the surfaces of the polymer film are usually embossed to form textures (i.e., a designed concavo-convex structure) to facilitate de-airing during pre-pressing, thereby avoiding generating bubbles in the laminated glass. In addition, polymer films are cut to the desired size during the manufacture of laminated glasses, and the cut polymer films are piled on one another before being subjected to a pressing process. However, the piled polymer films will adhere to each other due to gravity and the stickiness of the polymer film, making it difficult to separate the piled polymer films without damaging the polymer films. Furthermore, the difficulties in sufficiently removing the air remaining between the glass sheets and polymer film of a laminated glass during the manufacture of laminated glass results in laminated glass with poor appearance or poor weatherability.

SUMMARY OF THE INVENTION

Surprisingly, the inventors found that the above problems can be resolved by means of controlling the peak material volume (Vmp) and kurtosis (Sku) of the surface of the polymer film. Thus, the present invention relates to a polymer film with a specific peak material volume and kurtosis. The polymer films of the present invention barely adhere to each other and thus can pass a "self-adhesion test". Furthermore, the laminated glass manufactured from the polymer film of the present invention does not have bubble defects. In the preferred embodiments of the present invention, the polymer film particularly has excellent weatherability. The weatherability is demonstrated by the result of the "high-temperature bubble test" described in the specification.

Specifically, an objective of the present invention is to provide a polymer film, which has a first surface and a second surface, wherein the first surface has a peak material volume (Vmp) at a material ratio of 10% ranging from 0.15 $\mu m^3/\mu m^2$ to 1.20 $\mu m^3/\mu m^2$, and a kurtosis (Sku) ranging from 0.73 to 10.02, wherein the material ratio, peak material volume, and kurtosis are defined in accordance with ISO 25178-2:2012.

In some embodiments of the present invention, the second surface has a Vmp at a material ratio of 10% ranging from 0.15 $\mu m^3/\mu m^2$ to 1.20 $\mu m^3/\mu m^2$, and a Sku ranging from 0.73 to 10.02, wherein the material ratio, Vmp, and Sku are defined in accordance with ISO 25178-2:2012.

In some embodiments of the present invention, the first surface and the second surface independently have a mean width of profile elements (Rsm) ranging from 10 μm to 660 μm, wherein the mean width of profile elements is defined in accordance with ISO 4287:1997.

In some embodiments of the present invention, the polymer film has a glass transition temperature (Tg) ranging from 5° C. to 23° C.

In some embodiments of the present invention, the polymer film comprises polyvinyl acetal.

In some embodiments of the present invention, the polyvinyl acetal can be selected from the group consisting of poly(vinyl formal), poly(vinyl acetal), poly(vinyl butyral), poly(vinyl pentanal), poly(vinyl hexanal), and combinations thereof. In the preferred embodiments of the present invention, the polyvinyl acetal is poly(vinyl butyral).

In some embodiments of the present invention, the polyvinyl acetal has a number average molecular weight (Mn) ranging from 90,000 to 120,000.

In some embodiments of the present invention, the polymer film further comprises a plasticizer.

In some embodiments of the present invention, based on 100 parts by weight of the polyvinyl acetal, the amount of the plasticizer ranges from 35 parts by weight to 50 parts by weight.

Another objective of the present invention is to provide a laminated glass, which comprises a first glass sheet, a second glass sheet, and an intermediate film disposed between the first glass sheet and the second glass sheet, wherein the intermediate film is provided by the aforementioned polymer film.

To render the above objectives, technical features, and advantages of the present invention more apparent, the present invention will be described in detail with reference to some embodiments hereinafter.

BRIEF DESCRIPTION OF THE DRAWINGS

Not applicable.

DESCRIPTION OF THE PREFERRED EMBODIMENTS

Hereinafter, some embodiments of the present invention will be described in detail. However, the present invention may be embodied in various embodiments and should not be limited to the embodiments described in the specification.

Unless otherwise specified, the expressions "a," "the," or the like recited in the specification and the claims should include both singular and plural forms.

Unless otherwise specified, the expressions "first," "second," or the like recited in the specification and the claims are merely used to distinguish the illustrated elements or constituents without special meanings. Those expressions are not used to indicate any priority.

The term "material ratio" as recited in the specification and the claims is defined in accordance with ISO 25178-2: 2012. A material ratio curve means a function curve graph representing the surface height to a regional area enclosed thereby, and a material ratio means an enclosed regional area above a designated height.

The term "peak material volume (Vmp)" as recited in the specification and the claims is defined in accordance with ISO 25178-2:2012. The peak material volume is the volume of the reduced peak of material at a specific material ratio.

The term "kurtosis (Sku)" as recited in the specification and the claims is defined in accordance with ISO 25178-2: 2012. The kurtosis is a measure of the sharpness of the surface height distribution of the roughness profile. When the Sku is 3, the height distribution is a normal distribution, wherein sharp portions and indented portions co-exist. When the Sku is less than 3, the height distribution is flat. When the Sku is greater than 3, the height distribution is spiked.

The term "mean width of profile elements (Rsm)" as recited in the specification and the claims is defined in accordance with ISO 4287:1997. The Rsm is an average length of the profile elements along the sampling length, representing the distance between embossed textures.

The present invention provides a polymer film with a specific peak material volume (Vmp) and kurtosis (Sku) that solves the adhesion problem of piled polymer films. The polymer film of the present invention can be used to provide laminated glass with no bubble defects, especially laminated glass with no bubble defects and with good weatherability. The polymer film of the present invention can facilitate the manufacturing process of laminated glass and can avoid polymer film waste. The polymer film of the present invention and the applications thereof are described in detail below.

1. Polymer Film 1.1. Surface Characteristics of Polymer Film
1.1.1. Peak Material Volume (Vmp) and Kurtosis (Sku)

To facilitate the manufacture of laminated glass, the polymer films are usually cut to size corresponding to a glass sheet, and the cut polymer films are piled on one another before being subject to a pressing process. However, due to the stickiness of the polymer and gravity influence, the piled polymer films usually adhere to each other. In addition, to facilitate the removal of air to avoid leaving air between the glass sheets and polymer film (i.e., bubble defects), the surfaces of the polymer film are usually formed with textures (i.e., a specific concavo-convex structure), which can facilitate de-airing during the pre-pressing of polymer film and glass sheets. However, in practice, it is difficult to sufficiently remove the air between the glass sheets and polymer film of the laminated glass during the manufacturing process of laminated glass, such that the manufactured laminated glass is usually provided with poor weatherability or even a poor appearance with bubble defects at the time it is manufactured. The inventors found that controlling the peak material volume (Vmp) and kurtosis (Sku) of the surface of the polymer film within a specific range can solve the adhesion problem and bubble defect problem and improve the weatherability of laminated glass. The Vmp and Sku are parameters relevant to surface roughness. The relevant descriptions for the Vmp and Sku parameters can refer to ISO 25178-2: 2012, a measurement standard for evaluating surface morphology, and the subject matters of which are incorporated herein in their entirety by reference.

Specifically, the polymer film of the present invention has a first surface and a second surface, wherein the first surface has a Vmp value at a material ratio of 10% ranging from 0.15 $\mu m^3/\mu m^2$ to 1.20 $\mu m^3/\mu m^2$. For example, the Vmp value of the first surface can be 0.15 $\mu m^3/\mu m^2$, $\mu m^3/\mu m^2$, 0.17 $\mu m^3/\mu m^2$, 0.18 $\mu m^3/\mu m^2$, 0.19 $\mu m^3/\mu m^2$, 0.20 $\mu m^3/\mu m^2$, 0.21 $\mu m^3/\mu m^2$, 0.22 $\mu m^3/\mu m^2$, 0.23 $\mu m^3/\mu m^2$, 0.24 $\mu m^3/\mu m^2$, 0.25 $\mu m^3/\mu m^2$, 0.26 $\mu m^3/\mu m^2$, 0.27 $\mu m^3/\mu m^2$, 0.28 $\mu m^3/\mu m^2$, 0.29 $\mu m^3/\mu m^2$, 0.30 $\mu m^3/\mu m^2$, 0.31 $\mu m^3/\mu m^2$, 0.32 $\mu m^3/\mu m^2$, 0.33 $\mu m^3/\mu m^2$, 0.34 $\mu m^3/\mu m^2$, 0.35 $\mu m^3/\mu m^2$, 0.36 $\mu m^3/\mu m^2$, 0.37 $\mu m^3/\mu m^2$, 0.38 $\mu m^3/\mu m^2$, 0.39 $\mu m^3/\mu m^2$, 0.40 $\mu m^3/\mu m^2$, 0.41 $\mu m^3/\mu m^2$, 0.42 $\mu m^3/\mu m^2$, 0.43 $\mu m^3/\mu m^2$, 0.44 $\mu m^3/\mu m^2$, 0.45 $\mu m^3/\mu m^2$, 0.46 $\mu m^3/\mu m^2$, 0.47 $\mu m^3/\mu m^2$, 0.48 $\mu m^3/\mu m^2$, 0.49 $\mu m^3/\mu m^2$, 0.50 $\mu m^3/\mu m^2$, 0.51 $\mu m^3/\mu m^2$, 0.52 $\mu m^3/\mu m^2$, 0.53 $\mu m^3/\mu m^2$, 0.54 $\mu m^3/\mu m^2$, 0.55 $\mu m^3/\mu m^2$, 0.56 $\mu m^3/\mu m^2$, 0.57 $\mu m^3/\mu m^2$, 0.58 $\mu m^3/\mu m^2$, 0.59 $\mu m^3/\mu m^2$, 0.60 $\mu m^3/\mu m^2$, 0.61 $\mu m^3/\mu m^2$, 0.62 $\mu m^3/\mu m^2$, 0.63 $\mu m^3/\mu m^2$, 0.64 $\mu m^3/\mu m^2$, 0.65 $\mu m^3/\mu m^2$, 0.66 $\mu m^3/\mu m^2$, 0.67 $\mu m^3/\mu m^2$, 0.68 $\mu m^3/\mu m^2$, 0.69 $\mu m^3/\mu m^2$, 0.70 $\mu m^3/\mu m^2$, 0.71 $\mu m^3/\mu m^2$, 0.72 $\mu m^3/\mu m^2$, 0.73 $\mu m^3/\mu m^2$, 0.74 $\mu m^3/\mu m^2$, 0.75 $\mu m^3/\mu m^2$, 0.76 $\mu m^3/\mu m^2$, 0.77 $\mu m^3/\mu m^2$, 0.78 $\mu m^3/\mu m^2$, 0.79 $\mu m^3/\mu m^2$, 0.80 $\mu m^3/\mu m^2$, 0.81 $\mu m^3/\mu m^2$, 0.82 $\mu m^3/\mu m^2$, 0.83 $\mu m^3/\mu m^2$, 0.84 $\mu m^3/\mu m^2$, 0.85 $\mu m^3/\mu m^2$, 0.86 $\mu m^3/\mu m^2$, 0.87 $\mu m^3/\mu m^2$, 0.88 $\mu m^3/\mu m^2$, 0.89 $\mu m^3/\mu m^2$, 0.90 $\mu m^3/\mu m^2$, 0.91 $\mu m^3/\mu m^2$, 0.92 $\mu m^3/\mu m^2$, 0.93 $\mu m^3/\mu m^2$, 0.94 $\mu m^3/\mu m^2$, 0.95 $\mu m^3/\mu m^2$, 0.96 $\mu m^3/\mu m^2$, 0.97 $\mu m^3/\mu m^2$, 0.98 $\mu m^3/\mu m^2$, 0.99 $\mu m^3/\mu m^2$, 1.00 $\mu m^3/\mu m^2$, 1.01 $\mu m^3/\mu m^2$, 1.02 $\mu m^3/\mu m^2$, 1.03 $\mu m^3/\mu m^2$, 1.04 $\mu m^3/\mu m^2$, 1.05 $\mu m^3/\mu m^2$, 1.06 $\mu m^3/\mu m^2$, 1.07 $\mu m^3/\mu m^2$, 1.08 $\mu m^3/\mu m^2$, 1.09 $\mu m^3/\mu m^2$, 1.10 $\mu m^3/\mu m^2$, 1.11 $\mu m^3/\mu m^2$, 1.12 $\mu m^3/\mu m^2$, 1.13 $\mu m^3/\mu m^2$, 1.14 $\mu m^3/\mu m^2$, 1.15 $\mu m^3/\mu m^2$, 1.16 $\mu m^3/\mu m^2$, 1.17 $\mu m^3/\mu m^2$, 1.18 $\mu m^3/\mu m^2$, 1.19 $\mu m^3/\mu m^2$, or 1.20 $\mu m^3/\mu m^2$, or within a range between any two of the values described herein. Vmp is the volume of reduced peak of material at a specific material ratio. By controlling the Vmp value of the first surface of the polymer film at a material ratio of 10% within a designated range, the adhesion problem of the piled polymer films can be solved and the efficacy of de-airing during the pre-pressing can be improved.

In addition, the first surface of the polymer film of the present invention has a Sku value ranging from 0.73 to 10.02. For example, the Sku value of the first surface can be 0.73, 0.74, 0.76, 0.77, 0.78, 0.79, 0.80, 0.81, 0.82, 0.83, 0.84, 0.85, 0.86, 0.87, 0.88, 0.89, 0.90, 0.91, 0.93, 0.94, 0.95, 0.96, 0.97, 0.98, 0.99, 1.00, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, 2.00, 2.05, 2.10, 2.15, 2.20, 2.25, 2.30, 2.35, 2.40, 2.45, 2.50, 2.55, 2.60, 2.65, 2.70, 2.75, 2.80, 2.85, 2.90, 2.95, 3.00, 3.05, 3.10, 3.15, 3.20, 3.25, 3.30, 3.35, 3.40, 3.45, 3.50, 3.55, 3.60, 3.65, 3.70, 3.75, 3.80, 3.85, 3.90, 3.95, 4.00, 4.05, 4.10, 4.15, 4.20, 4.25, 4.30, 4.35, 4.40, 4.45, 4.50, 4.55, 4.60, 4.65, 4.70, 4.75, 4.80, 4.85, 4.90, 4.95, 5.00, 5.05, 5.10, 5.15, 5.20, 5.25, 5.30, 5.35, 5.40, 5.45, 5.50, 5.55, 5.60, 5.65, 5.70, 5.75, 5.80, 5.85, 5.90, 5.95, 6.00, 6.05, 6.10, 6.15, 6.20, 6.25, 6.30, 6.35, 6.40, 6.45, 6.50, 6.55, 6.60, 6.65, 6.70, 6.75, 6.80, 6.85, 6.90, 6.95, 7.00, 7.05, 7.10, 7.15, 7.20, 7.25, 7.30, 7.35, 7.40, 7.45, 7.50, 7.55, 7.60, 7.65, 7.70, 7.75, 7.80, 7.85, 7.90, 7.95, 8.00, 8.05, 8.10, 8.15, 8.20, 8.25, 8.30, 8.35, 8.40, 8.45, 8.50, 8.55, 8.60, 8.65, 8.70, 8.75, 8.80, 8.85, 8.90, 8.95, 9.00, 9.05, 9.10, 9.15, 9.20, 9.25, 9.30, 9.35, 9.40, 9.45, 9.50, 9.55, 9.60, 9.65, 9.70, 9.75, 9.80, 9.85, 9.90, 9.95, 10.00, or 10.02, or within a range between any two of the values described herein. Sku indicates the sharpness of the surface height distribution of the roughness profile. By controlling the Vmp value and the Sku value of the first surface at a material ratio of 10% within a designated range, the adhesion problem of the piled polymer films can be solved, and the efficacy of de-airing during the pre-pressing can be improved, thereby obtaining a laminated glass without bubble defects and with further excellent weatherability.

In the preferred embodiments of the present invention, the second surface of the polymer film has a Vmp at a material ratio of 10% ranging from 0.15 μm³/μm² to 1.20 μm³/μm², and the second surface of the polymer film has a Sku ranging from 0.73 to 10.02. The examples of the specific values of the Vmp and Sku properties of the second surface can refer to the relevant descriptions for the first surface.

In addition, under the identical value of Vmp, the lower the Sku, the more severe the adhesion of piled polymer films. Under the identical value of Sku, the higher the Vmp, the poorer the de-airing performance, resulting in laminated glasses with bubble defects and poor weatherability.

1.1.2. Mean Width of Profile Elements (Rsm)

In addition to the aforementioned parameters, the de-airing during the pre-pressing process of laminated glass can be further improved by controlling the mean width of profile elements (Rsm) of the surface of the polymer film. In the preferred embodiments of the present invention, the first surface of the polymer film and the second surface of the polymer film independently have a mean width of profile elements (Rsm) ranging from 10 μm to 660 μm. For example, the Rsm values of the first surface and the second surface can independently be 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 510 μm, 520 μm, 530 μm, 540 μm, 550 μm, 560 μm, 570 μm, 580 μm, 590 μm, 600 μm, 610 μm, 620 μm, 630 μm, 640 μm, 650 μm, or 660 μm, or within a range between any two of the values described herein. An overly high or low Rsm value will adversely affect the de-airing performance and thus result in bubble defects. Even the air remaining may dissolve into the polymer film after the autoclave pressing of the laminated glass (i.e., air dissolution phenomenon), allowing the laminated glass no bubble defects at the time the manufacture is done. The dissolved air will be released to form bubbles after long-term use of the laminated glass or under strict conditions. Therefore, such laminated glass has poor weatherability (i.e., the result of the "high temperature bubble test" is poor).

In addition, when the Vmp value and Sku value of the surface of the polymer film both fall within the designated ranges, an Rsm value within the aforementioned designated range can improve the weatherability of the laminated glass prepared from the polymer film (i.e., the result of the "high temperature bubble test" is better). Therefore, in the preferred embodiments of the present invention, the Vmp values, Sku values, and Rsm values of the first surface and second surface of the polymer film independently fall within the aforementioned designated ranges.

1.2. Constitution of Polymer Film

The polymer film of the present invention comprises polyvinyl acetal as an essential constituent and may further comprise other optional constituents, such as a plasticizer or other conventional additives, depending on needs. In some embodiments of the present invention, the polymer film comprises polyvinyl acetal and a plasticizer, or the polymer film consists essentially of polyvinyl acetal and a plasticizer, or the polymer film consists of polyvinyl acetal and a plasticizer.

The polymer film of the present invention may be a single-layer film composed of one single layer or a multi-layer film composed of multiple layers, as long as the polymer film as a whole has the designated Vmp value and Sku value, and preferably has the designated Rsm value. When the polymer film is a multilayer film, the layers of the polymer film can be made of identical or different materials and thus can be identical or different functional layers. The functional layer may be, for example, a layer with one or more of the following functions: acoustic insulation function, thermal insulation function, reflection function, anti-reflection function, refraction function, anti-refraction function, light-splitting function, and dimming function.

1.2.1. Polyvinyl Acetal

Examples of polyvinyl acetal include but are not limited to poly(vinyl formal), poly(vinyl acetal), poly(vinyl butyral), poly(vinyl pentanal), and poly(vinyl hexanal). The above-mentioned polyvinyl acetal can either be used alone or in a mixture of two or more. In the preferred embodiments of the present invention, the polyvinyl acetal is poly(vinyl butyral). In the appended examples, the polymer film consists of poly(vinyl butyral) and a plasticizer. Thus, the polymer film of the present invention is a "poly(vinyl butyral) film (PVB film)" or specifically a "plasticizer-containing PVB film".

The molecular weight of the polyvinyl acetal is not particularly limited. In some embodiments of the present invention, the number average molecular weight (Mn) of the polyvinyl acetal can range from 90,000 to 120,000. For example, the Mn of the polyvinyl acetal can be 90,000, 90,500, 91,000, 91,500, 92,000, 92,500, 93,000, 93,500, 94,000, 94,500, 95,000, 95,500, 96,000, 96,500, 97,000, 97,500, 98,000, 98,500, 99,000, 99,500, 100,000, 100,500, 101,000, 101,500, 102,000, 102,500, 103,000, 103,500, 104,000, 104,500, 105,000, 105,500, 106,000, 106,500, 107,000, 107,500, 108,000, 108,500, 109,000, 109,500, 110,000, 110,500, 111,000, 111,500, 112,000, 112,500, 113,000, 113,500, 114,000, 114,500, 115,000, 115,500, 116,000, 116,500, 117,000, 117,500, 118,000, 118,500, 119,000, 119,500, or 120,000, or within a range between any two of the values described herein, but the present invention is not limited thereto. In the preferred embodiments of the present invention, the Mn of the polyvinyl acetal ranges from 93,750 to 118,750.

In some embodiments of the present invention, based on the total weight of hydroxyl, acetal group, and acetyl group of polyvinyl acetal, the polyvinyl acetal can have a content of acetal group (i.e., a degree of acetalization) ranging from 75 wt % to 85 wt %. For example, based on the total weight of hydroxyl, acetal group, and acetyl group of polyvinyl acetal, the degree of acetalization of the polyvinyl acetal can be 75 wt %, 75.1 wt %, 75.2 wt %, 75.3 wt %, 75.4 wt %, 75.5 wt %, 75.6 wt %, 75.7 wt %, 75.8 wt %, 75.9 wt %, 76 wt %, 76.1 wt %, 76.2 wt %, 76.3 wt %, 76.4 wt %, 76.5 wt %, 76.6 wt %, 76.7 wt %, 76.8 wt %, 76.9 wt %, 77 wt %, 77.1 wt %, 77.2 wt %, 77.3 wt %, 77.4 wt %, 77.5 wt %, 77.6 wt %, 77.7 wt %, 77.8 wt %, 77.9 wt %, 78 wt %, 78.1 wt %, 78.2 wt %, 78.3 wt %, 78.4 wt %, 78.5 wt %, 78.6 wt %, 78.7 wt %, 78.8 wt %, 78.9 wt %, 79 wt %, 79.1 wt %, 79.2 wt %, 79.3 wt %, 79.4 wt %, 79.5 wt %, 79.6 wt %, 79.7 wt %, 79.8 wt %, 79.9 wt %, 80 wt %, 80.1 wt %, 80.2 wt %, 80.3 wt %, 80.4 wt %, 80.5 wt %, 80.6 wt %, 80.7 wt %, 80.8 wt %, 80.9 wt %, 81 wt %, 81.1 wt %, 81.2 wt %, 81.3 wt %, 81.4 wt %, 81.5 wt %, 81.6 wt %, 81.7 wt %, 81.8 wt %, 81.9 wt %, 82 wt %, 82.1 wt %, 82.2 wt %, 82.3 wt %, 82.4 wt %, 82.5 wt %, 82.6 wt %, 82.7 wt %, 82.8 wt %, 82.9 wt %, 83 wt %, 83.1 wt %, 83.2 wt %, 83.3 wt %, 83.4 wt %, 83.5 wt %, 83.6 wt %, 83.7 wt %, 83.8 wt %, 83.9 wt %, 84 wt %, 84.1 wt %, 84.2 wt %, 84.3 wt %, 84.4 wt %, 84.5 wt %, 84.6 wt %, 84.7 wt %, 84.8 wt %, 84.9 wt %, or 85 wt %, or within a range between any two of the values described herein. In the preferred embodiments of the present invention, based on the total weight of hydroxyl, acetal group, and acetyl group of polyvinyl acetal, the polyvinyl acetal can have a content of acetal group (i.e., a degree of acetalization) ranging from 78.4 wt % to 81.5 wt %.

In some embodiments of the present invention, based on the total weight of hydroxyl, acetal group, and acetyl group of polyvinyl acetal, the polyvinyl acetal can have a content of acetyl group (i.e., a degree of acetylization) ranging from 0 wt % to 1.5 wt %. For example, based on the total weight of hydroxyl, acetal group, and acetyl group of polyvinyl acetal, the degree of acetylization of the polyvinyl acetal can be 0 wt %, 0.05 wt %, 0.1 wt %, 0.15 wt %, 0.2 wt %, 0.25 wt %, 0.3 wt %, wt %, 0.4 wt %, 0.45 wt %, 0.5 wt %, 0.55 wt %, 0.6 wt %, 0.65 wt %, 0.7 wt %, 0.75 wt %, 0.8 wt %, 0.85 wt %, 0.9 wt %, 0.95 wt %, 1.0 wt %, 1.05 wt %, 1.1 wt %, 1.15 wt %, 1.2 wt %, 1.25 wt %, 1.3 wt %, 1.35 wt %, 1.4 wt %, 1.45 wt %, or 1.5 wt %, or within a range between any two of the values described herein. In the preferred embodiments of the present invention, based on the total weight of hydroxyl, acetal group, and acetyl group of polyvinyl acetal, the polyvinyl acetal can have a content of acetyl group (i.e., a degree of acetylization) ranging from 0.8 wt % to 1.2 wt %. If the degree of acetylization of polyvinyl acetal is higher than the designated range, the polymer film is relatively soft, and the embossed textures could be too deep.

In some embodiments of the present invention, based on the total weight of hydroxyl, acetal group, and acetyl group of polyvinyl acetal, the polyvinyl acetal can have a hydroxyl content ranging from 15 wt % to 25 wt %. For example, based on the total weight of hydroxyl, acetal group, and acetyl group of polyvinyl acetal, the hydroxyl content of the polyvinyl acetal can be 15 wt %, 15.1 wt %, 15.2 wt %, 15.3 wt %, 15.4 wt %, 15.5 wt %, 15.6 wt %, 15.7 wt %, 15.8 wt %, 15.9 wt %, 16 wt %, 16.1 wt %, 16.2 wt %, 16.3 wt %, 16.4 wt %, 16.5 wt %, 16.6 wt %, 16.7 wt %, 16.8 wt %, 16.9 wt %, 17 wt %, 17.1 wt %, 17.2 wt %, 17.3 wt %, 17.4 wt %, 17.5 wt %, 17.6 wt %, 17.7 wt %, 17.8 wt %, 17.9 wt %, 18 wt %, 18.1 wt %, 18.2 wt %, 18.3 wt %, 18.4 wt %, 18.5 wt %, 18.6 wt %, 18.7 wt %, 18.8 wt %, 18.9 wt %, 19 wt %, 19.1 wt %, 19.2 wt %, 19.3 wt %, 19.4 wt %, 19.5 wt %, 19.6 wt %, 19.7 wt %, 19.8 wt %, 19.9 wt %, 20 wt %, 20.1 wt %, 20.2 wt %, 20.3 wt %, 20.4 wt %, 20.5 wt %, 20.6 wt %, 20.7 wt %, 20.8 wt %, 20.9 wt %, 21 wt %, 21.1 wt %, 21.2 wt %, 21.3 wt %, 21.4 wt %, 21.5 wt %, 21.6 wt %, 21.7 wt %, 21.8 wt %, 21.9 wt %, 22 wt %, 22.1 wt %, 22.2 wt %, 22.3 wt %, 22.4 wt %, 22.5 wt %, 22.6 wt %, 22.7 wt %, 22.8 wt %, 22.9 wt %, 23 wt %, 23.1 wt %, 23.2 wt %, 23.3 wt %, 23.4 wt %, 23.5 wt %, 23.6 wt %, 23.7 wt %, 23.8 wt %, 23.9 wt %, 24 wt %, 24.1 wt %, 24.2 wt %, 24.3 wt %, 24.4 wt %, 24.5 wt %, 24.6 wt %, 24.7 wt %, 24.8 wt %, 24.9 wt %, or 25 wt %, or within a range between any two of the values described herein. In the preferred embodiments of the present invention, based on the total weight of hydroxyl, acetal group, and acetyl group of polyvinyl acetal, the polyvinyl acetal can have a hydroxyl content ranging from 17.5 wt % to 20.6 wt %. When the hydroxyl content of the polyvinyl acetal is higher than the designated range, the polymer film is relatively hard, making it relatively difficult to form embossed textures. When the hydroxyl content of the polyvinyl acetal is lower than the designated range, the polymer film is relatively soft, and the embossed textures could be too deep.

1.2.2. Plasticizer

As used herein, a plasticizer, also called a plasticizing agent, is a chemical substance that can modify the plasticity of a thermoplastic resin. Examples of the plasticizer include but are not limited to esters of polybasic acids or polyhydric alcohols, such as triethylene glycol bis(2-ethylhexanoate), tetraethylene glycol bis(2-ethylhexanoate), triethylene glycol bis(2-ethylbutyrate), tetraethylene glycol bis(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, bis[2-(2-butoxyethoxy)ethyl] adipate, polymeric adipates, dipropylene glycol dibenzoate, tripropylene glycol dibenzoate, polypropylene glycol dibenzoate, isodecyl benzoate, 2-ethylhexyl benzoate, propylene glycol dibenzoate, diisononyl phthalate, dibutoxyethyl terephthalate, castor oil, methyl ricinoleate, soybean oils, epoxidized soybean oils, and combinations thereof. In the appended examples, triethylene glycol bis(2-ethylhexanoate) is used.

The amount of the plasticizer is not particularly limited as long as the plasticizer can provide the desired plasticizing effect. In general, based on 100 parts by weight of polyvinyl acetal, the amount of the plasticizer can range from 35 parts by weight to 50 parts by weight. For example, based on 100 parts by weight of polyvinyl acetal, the amount of the plasticizer can be 35 parts by weight, 36 parts by weight, 37 parts by weight, 38 parts by weight, 39 parts by weight, 40 parts by weight, 41 parts by weight, 42 parts by weight, 43 parts by weight, 44 parts by weight, 45 parts by weight, 46 parts by weight, 47 parts by weight, 48 parts by weight, 49 parts by weight, or 50 parts by weight, or within a range between any two of the values described herein. In some embodiments of the present invention, based on 100 parts by weight of polyvinyl acetal, the amount of the plasticizer ranges from 37 parts by weight to 48 parts by weight. When the amount of the plasticizer is higher than the designated range, the polymer film is relatively soft, and the embossed textures could be too deep. When the amount of the plasticizer is lower than the designated range, the polymer film is relatively hard, making it relatively difficult to form embossed textures.

1.2.3. Other Conventional Additives

The polymer film may further comprise other conventional additives. Conventional additives can be any substances that can adaptively improve the workability of the polymer film during its manufacture or impart specific functions to the polymer film. Examples of conventional additives include but are not limited to dyes, pigments, stabilizers, antioxidants, flame retardants, infrared absorbers, infrared blocking agents, ultraviolet absorbers, ultraviolet stabilizers, lubricants, dispersing agents, surfactants, chelating agents, coupling agents, binders, and adhesion controlling agents. The above-mentioned additives can be used alone or in a mixture of two or more. For example, the polymer film can comprise a dye or pigment to become a colored polymer film. The polymer film can also comprise an ultraviolet absorber or infrared absorber to become a polymer film with an anti-ultraviolet function or anti-infrared function.

1.3. Other Properties of Polymer Film 1.3.1. Glass Transition Temperature (Tg)

In some embodiments of the present invention, the glass transition temperature (Tg) of the polymer film may range from 5° C. to 23° C. For example, the Tg of the polymer film can be 5° C., 6° C., 6.5° C., 7° C., 7.5° C., 8° C., 8.5° C., 9° C., 9.5° C., 10° C., 10.5° C., 11° C., 11.5° C., 12° C., 12.5° C., 13° C., 13.5° C., 14° C., 14.5° C., 15° C., 15.5° C., 16° C., 16.5° C., 17° C., 17.5° C., 18° C., 18.5° C., 19° C., 19.5° C., 20° C., 20.5° C., 21° C., 21.5° C., 22° C., 22.5° C., or 23° C., or within a range between any two of the values described herein. When the Tg of the polymer film is higher than the designated range, the polymer film is relatively hard, making it relatively difficult to form the desired textures via machine embossing. When the Tg of the polymer film is lower than the designated range, the polymer film is relatively soft, and the embossed textures formed via machine embossing could be too deep. According to the present invention, the Tg of the polymer film preferably ranges from 6° C. to 22.5° C., and more preferably from 10° C. to 22.5° C.

1.3.2. Thickness

The polymer film of the present invention can have a uniform thickness, and the thickness can be adjusted depending on the needs as long as the polymer film has the designated Vmp value and Sku value. In general, the thickness of the polymer film can range from 0.1 mm to 2.5 mm. For example, the thickness of the polymer film can be 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, 1.0 mm, 1.05 mm, 1.1 mm, 1.15 mm, 1.2 mm, 1.25 mm, 1.3 mm, 1.35 mm, 1.4 mm, 1.45 mm, 1.5 mm, 1.55 mm, 1.6 mm, 1.65 mm, 1.7 mm, 1.75 mm, 1.8 mm, 1.85 mm, 1.9 mm, 1.95 mm, 2.0 mm, 2.05 mm, 2.1 mm, 2.15 mm, 2.2 mm, 2.25 mm, 2.3 mm, 2.35 mm, 2.4 mm, 2.45 mm, or 2.5 mm, or within a range between any two of the values described herein. In the appended examples, the thickness of the polymer film is 0.38 mm, 0.76 mm, or 1.52 mm.

The polymer film of the present invention can be a wedge film with different thicknesses at two ends. The wedge film is usually used for preparing automotive head-up displays (HUD); thus, as used herein, it is also called a "HUD film". In some embodiments of the present invention, the thickness of the HUD film at the thinner end may range from 0.5 mm to 1 mm. For example, the thickness of the HUD film at the thinner end can be 0.5 mm, 0.55 mm, 0.6 mm, 0.65 mm, 0.7 mm, 0.75 mm, 0.8 mm, 0.85 mm, 0.9 mm, 0.95 mm, or 1 mm, or within a range between any two of the values described herein. In some embodiments of the present invention, the thickness of the HUD film at the thicker end may range from 1.2 mm to 1.7 mm. For example, the thickness of the HUD film at the thicker end can be 1.2 mm, 1.25 mm, 1.3 mm, 1.35 mm, 1.4 mm, 1.45 mm, 1.5 mm, 1.55 mm, 1.6 mm, 1.65 mm, or 1.7 mm, or within a range between any two of the values described herein. In the appended examples, the HUD film is 0.76 mm thick at the thinner end and 1.45 mm thick at the thicker end, and the width of the HUD film is 1200 mm.

1.4. Manufacture of Polymer Film

The method for preparing the polymer film of the present invention is not particularly limited. For example, the polymer film of the present invention may be manufactured by mixing and kneading the polyvinyl acetal and optional constituents (e.g., a plasticizer) to obtain a polymer composition, using the polymer composition to provide a polymer film by means of a conventional film forming method, and performing the machine embossing step to provide the desired Vmp value and Sku value and optional the desired Rsm value on the surface of the polymer film. Examples of the conventional method for providing the polymer film include but are not limited to a calendering method, a casting method, an extrusion stretching method, a direct extruding method, and an extrusion blowing method.

In some embodiments of the present invention, the polymer film with uniform thickness is manufactured as follows, but the present invention is not limited thereto. A polyvinyl acetal resin (e.g. PVB) and a plasticizer are mixed and kneaded using a mixer at a temperature ranging from 100° C. to 150° C. and a rotational speed ranging from 10 rpm to 50 rpm for 5 minutes to 30 minutes to obtain a polymer composition. The polymer composition is cooled down to room temperature and then placed in an extruder to form a polymer film (a PVB film). The above film-forming steps can be optionally repeated, and the constitution of the polymer composition can be optionally adjusted to provide films with different functions. These films can be laminated to form a polymer film with a multilayer structure.

In some embodiments of the present invention, the HUD film is manufactured as follows, but the present invention is not limited thereto. A polyvinyl acetal resin (e.g. PVB) and a plasticizer are mixed and kneaded using a mixer at a temperature ranging from 100° C. to 150° C. with a rotational speed ranging from 10 rpm to 50 rpm for 5 minutes to 30 minutes to obtain a polymer composition. The polymer composition is cooled down to room temperature and then placed in an extruder to form a film, with the proviso that the output end of the extruder is set to provide a wedge shape, making the extruded polymer film have different thicknesses at two ends (i.e., the thicker end and the thinner end).

Afterward, the polymer film is subjected to preheating and machine embossing to provide the desired Vmp value and Sku value and optional Rsm value. The machine embossing is directed to a process of forming textures on the surface of the prepared polymer film by using a roller. Examples of machine embossing methods include but are not limited to an embossing roller method or a calendaring roller method. The embossing roller method is preferred. The texture types provided by the machine embossing are not limited and include rhombus texture, line texture, sawtooth texture, square texture, taper texture, circle texture, sub-circle texture, and irregular texture. The above-mentioned texture types can be used alone or in a combination of two or more.

The Vmp, Sku, and Rsm properties of the polymer film can be adjusted by controlling the diameter of the embossing roller and the rotational speed of the embossing roller. In general, the area of the embossing roller contacted with the surface of the polymer film is usually one-third of the perimeter of the embossing roller. The larger the diameter of the embossing roller, the larger the perimeter of the embossing roller and thus the larger the area of the embossing roller that is in contact with the surface of the polymer film, the polymer film is then subjected to a longer duration of hot-pressing and thus has deeper (spiked) embossed textures on the surface. By contrast, a smaller diameter of the embossing roller results in shallower (indented) embossed textures on the surface of the polymer film. Furthermore, the larger the rotational speed of the embossing roller, the faster the moving speed of the polymer film, the polymer film is then subjected to a shorter duration of hot-pressing and thus has shallower and uneven embossed textures on the surface of the polymer film as well as a shorter distance between textures, resulting in a lower Rsm value. By contrast, a lower rotational speed of the embossing roller results in a slower moving speed of the polymer film, the polymer film is then subjected to a longer duration of hot-pressing and thus has deeper and uniform textures on the surface as well as longer distances between textures, resulting in a higher Rsm value. Therefore, the Vmp value and Sku value can be increased or reduced to provide a polymer film with the required Vmp and Sku features by collaboratively adjusting the diameter of the embossing roller and the rotational speed of the embossing roller during the manufacture of the polymer film.

2. Laminated Glass

The polymer film of the present invention can be used to manufacture laminated glass. Thus, the present invention also provides a laminated glass, which comprises a first glass sheet, a second glass sheet, and an intermediate film disposed between the first glass sheet and the second glass sheet, wherein the aforementioned polymer film provides the intermediate film.

The first and second glass sheets may be identical to or different from each other and can be any conventional glass sheets suitable for manufacturing laminated glass. Examples of conventional glass sheets suitable for manufacturing laminated glass include but are not limited to a float glass sheet, a tempered glass sheet, a wired glass sheet, or a plain plate-glass sheet, but the present invention is not limited thereto. In the appended examples, float glass sheets are used as the first and second glass sheets.

The laminated glass of the present invention can be manufactured by any laminated glass manufacturing method known in the art. For example, the laminated glass of the present invention can be manufactured as follows. A polymer film is interposed between two glass sheets to obtain a laminated object, the laminated object is placed into an airtight bag, and the air in the airtight bag is evacuated from the airtight bag (vacuum degree: >500 mmHg, such as 700 mmHg) at a temperature of 20° C. to 30° C. for at least 10 minutes. Then, the airtight bag with the laminated object contained therein is placed into a heating furnace, wherein the temperature of the heating furnace was slowly increased from 60° C. to 140° C. After at least 40 minutes, the airtight bag is taken out from the heating furnace to complete pre-pressing. Then, the pre-pressed laminated object is placed in an autoclave and hot-pressed under high pressure and temperature condition for 100 minutes to 150 minutes to obtain a laminated glass. In general, the high pressure and temperature condition include a pressure ranging from 10 bar to 15 bar and a temperature ranging from 100° C. to 150° C.

3. Example 3.1. Testing Methods

The present invention is further illustrated by the embodiments hereinafter, wherein the testing instruments and methods are as follows.

[Measurement of Molecular Weight Distribution of Polyvinyl Acetal]

The molecular weight distribution of polyvinyl acetal is measured by means of gel permeation chromatography (GPC), wherein polyvinyl acetal is dissolved in tetrahydrofuran (THF) and subjected to GPC analysis under the conditions below. The molecular weight of polyvinyl acetal is calculated based on the ratio corresponding to the area of standard polystyrene (Water PS STD).

Device: Waters 1515 PUMP system
Detector: Waters 2414 RI
Elution condition: 1.0 mL/min, THF
Column: Waters Styragel HR5 THF, Waters Styragel HR4 THF, Waters Styragel HR3 THF,
Waters Styragel HR1 THF

[Measurement of Acetalization Degree, Acetylization Degree and Hydroxyl Content of Polyvinyl Acetal]

The acetalization degree, acetylization degree and hydroxyl content of polyvinyl acetal are measured in accordance with JIS K6728.

[Measurement of Glass Transition Temperature (Tg)]

The Tg of the polymer film is measured in a nitrogen atmosphere using a differential scanning calorimeter (model no.: TA DSC 25, available from TA Instruments). First, 7 mg of the polymer film as a sample is placed on the sample platform of the differential scanning calorimeter, heated to 150° C. with a heating rate of 10° C./min, and held at that temperature for 5 minutes. The sample is then balanced at −50° C. and held at that temperature for 5 minutes. After that, the sample is heated to 100° C. with a heating rate of 10° C./min to obtain a curve graph of temperature to heat flow (X-axis is temperature and Y-axis is heat flow). The temperature corresponding to the glass transition midpoint is recorded as Tg.

[Measurement of Vmp and Sku]

First, a piece of 30 cm×30 cm polymer film is prepared, and five test samples are obtained as follows: four pieces of 3 cm×3 cm test samples are cut from four corners of the polymer film with a distance of 1 (one) cm away from the edges, and one piece of 3 cm×3 cm test sample is cut from the center of the polymer film. Next, the surface textures of the polymer film are analyzed using the test samples and a laser confocal microscope (model no.: LEXT OLS5000-SAF, available from Olympus) at a temperature of 24±3° C. and relative humidity of 63±3% in accordance with ISO 25178-2:2012, thereby obtaining the Vmp value at a material ratio of 10% and the Sku value. The measuring conditions are as follows: the light source has a wavelength of 405 nm, the objective lenses are 100×(MPLAPON-100×LEXT), the optical zoom is 50×, the image area is 1500 μm×1500 the resolution is 1024 pixels×1024 pixels, the operation conditions are set to auto tilt removal, and no filter is used.

In the obtained material ratio curve, the Vmp value at a material ratio of 10% can be obtained, and the unit of the Vmp value is $\mu m^3/\mu m^2$. In addition, the Sku value can be obtained by programmed computation. In the appended examples, the Vmp value of the polymer film is the average of the Vmp values of the five test samples, and the Sku value of the polymer film is the average of the Sku values of the five test samples.

[Measurement of Rsm]

First, a piece of 30 cm×30 cm polymer film is prepared, and five test samples are obtained as follows: four pieces of 3 cm×3 cm test samples are cut from four corners of the polymer film with a distance of 1 (one) cm away from the edges, and one piece of 3 cm×3 cm test sample is cut from the center of the polymer film. Next, the Rsm value of the surface of the polymer film are analyzed by using the test samples and a laser confocal microscope at a temperature of 24±3° C. and relative humidity of 63±3% in accordance with ISO 4287:1997. The measuring conditions are as follows: the light source has a wavelength of 405 nm, the objective lenses are 100×, the optical zoom is 50×, the image area is 1500 μm×1500 the resolution is 1024 pixels×1024 pixels, the operation conditions are set to auto tilt removal, and no filter is used. In the appended examples, the Rsm value of the polymer film is the average of the Rsm value of the five test samples.

[Bubble Residue Evaluation]

After the laminated glass is manufactured, bubble residue evaluation is immediately performed with unaided eyes to see whether there are bubbles. The observation is carried out in the region that is 15 mm or less (shortest distance) away from the edge of the glass sheet (i.e., the region where bubbles are most likely to be found). The criteria for bubble residue evaluation are as follows.

⊚: No bubble is found.
○: One bubble is found.
x: Two or more bubbles are found.

[High-Temperature Bubble Residue Test]

A test sample with a size of 30 cm×30 cm is cut from the laminated glass. The test sample is placed vertically in an oven at 120° C. for 2 hours. Then, the test sample is taken out and observed with unaided eyes to see whether there are bubbles. The observation is carried out in the region that is 15 mm or less (shortest distance) away from the edge of the glass sheet (i.e., the region where bubbles are most likely to be found). The criteria for the high-temperature bubble residue test are as follows.

⊚): No bubble is found.
○: One bubble is found.
x: Two or more bubbles are found.

[Self-Adhesion Test]

First, two test samples, each with a size of 10 cm×2 cm, are cut from the polymer film. Next, two test samples are superposed together to obtain a superposed sample with a 2 cm×2 cm region where the two test samples are not in contact to be used as a clamping area. At a temperature of 25° C., the superposed sample is pressed by a 10 kg object for 30 minutes, with the proviso that the clamping area is not pressed. Afterward, a universal testing machine (model: AI-7000M, available from GOTECH) is used to clamp the clamping area of the superposed sample, and the two test samples are pulled apart at a pulling speed of 2 cm/min or 1 cm/min. If the two test samples firmly adhere to each other, the pulling speed is optionally reduced to increase the force-bearing time. The self-adhesion property of the polymer film is evaluated based on the following criteria.

A: The two test samples can be separated at a pulling speed of 2 cm/min, and no adhesion is found.
B: The two test samples can be separated at a pulling speed of 1 cm/min, and no adhesion is found.
C: The two test samples cannot be separated.

3.2. Manufacture and Measurement of Properties of Polymer Film

First, 100 parts by weight of poly(vinyl butyral) (PVB, available from Chang Chun Petrochemical Co., Ltd.) and a plasticizer (triethylene glycol bis(2-ethylhexanoate)) in the amount according to Tables 1-1 and 1-2 were mixed to obtain a mixture. The mixture was kneaded using a mixer at 120° C. with a rotational speed of 35 rpm for 15 minutes. Then the mixture was cooled to room temperature to obtain a polymer film composition. The polymer film composition was placed in an extruder to obtain a polymer film. The thickness of the polymer film is shown in Tables 1-1 and 1-2. The properties of the PVB and the polymer film, including the Mn, degree of acetalization, degree of acetylization and hydroxyl content of the PVB, and the Tg of the polymer film manufactured therefrom, were measured according to the aforementioned testing methods. The results are listed in Tables 1-1 and 1-2.

The two surfaces of the polymer film were subjected to preheating and machine embossing in accordance with the parameter conditions as recited in Tables 2-1 and 2-2 to obtain the polymer films of Examples 1 to 11 and Comparative Examples 1 to 7. In addition to the parameter conditions recited in Tables 2-1 and 2-2, the linear velocity of the polymer film passing through the pair of embossing rollers is 18 m/min. The Vmp, Sku, and Rsm values of the polymer films of Examples 1 to 11 and Comparative Examples 1 to 7 were measured according to the aforementioned testing methods. The results are listed in Tables 2-1 and 2-2.

TABLE 1-1

| | | Properties of the polymer films of Examples 1 to 11 | | | | | |
|---|---|---|---|---|---|---|---|
| | | Content of plasticizer | Thickness | Degree of acetalization | Degree of acetylization | Hydroxyl content | Tg | |
| | | Unit | | | | | | |
| | | parts by weight | mm | wt % | wt % | wt % | ° C. | Mn |
| Example | 1 | 42 | 0.38 | 79.5 | 1.0 | 19.5 | 15.93 | 118,750 |
| | 2 | 43 | 0.38 | 79.2 | 1.0 | 19.8 | 10.36 | 93,750 |
| | 3 | 43 | 0.76 | 80.1 | 1.0 | 18.9 | 11.28 | 106,250 |
| | 4 | 42 | 0.76 | 79.9 | 1.0 | 19.1 | 14.94 | 109,375 |
| | 5 | 40 | 1.52 | 79.4 | 1.0 | 19.6 | 13.08 | 112,500 |
| | 6 | 37 | 1.52 | 78.4 | 1.0 | 20.6 | 22.14 | 118,750 |
| | 7 | 41 | Thinner end: 0.76 Thicker end: 1.45 | 80.5 | 1.0 | 18.5 | 12.94 | 106,250 |
| | 8 | 38 | Thinner end: 0.76 Thicker end: 1.45 | 78.6 | 1.0 | 20.4 | 18.24 | 109,375 |
| | 9 | 42 | 0.76 | 79.1 | 1.0 | 19.9 | 14.83 | 109,375 |
| | 10 | 43 | 0.76 | 79.6 | 1.0 | 19.4 | 14.13 | 118,750 |
| | 11 | 48 | 0.76 | 81.5 | 1.0 | 17.5 | 6.28 | 93,750 |

TABLE 1-2

Properties of the polymer films of Comparative Examples 1 to 7

| | | Content of plasticizer | Thickness | Degree of acetalization | Degree of acetylization | Hydroxyl content | Tg | |
|---|---|---|---|---|---|---|---|---|
| | | parts by weight | mm | wt % | wt % | wt % | ° C. | Mn |
| Comparative Example | 1 | 42 | 0.38 | 79.7 | 1.0 | 19.3 | 13.56 | 109,375 |
| | 2 | 43 | Thinner end: 0.76 Thicker end: 1.45 | 80.3 | 1.0 | 18.7 | 14.62 | 118,750 |
| | 3 | 39 | 0.76 | 79.4 | 1.0 | 19.6 | 13.82 | 112,500 |
| | 4 | 38 | 1.52 | 80.5 | 1.0 | 18.5 | 17.92 | 93,750 |
| | 5 | 42 | 0.76 | 79.6 | 1.0 | 19.4 | 15.83 | 118,750 |
| | 6 | 34 | 0.76 | 78.2 | 1.0 | 20.8 | 25.38 | 106,250 |
| | 7 | 55 | 0.76 | 82.2 | 1.0 | 16.8 | 2.18 | 93,750 |

TABLE 2-1

Conditions of machine embossing and properties of the polymer films of Examples 1 to 11

| | | Diameter of embossing roller | Rotational speed of embossing roller | Vmp | Sku | Rsm |
|---|---|---|---|---|---|---|
| | | cm | rpm | µm³/µm² | | µm |
| Example | 1 | 170 | 27 | 0.40 | 8.30 | 596.4 |
| | 2 | 150 | 32 | 0.60 | 6.20 | 455.1 |
| | 3 | 140 | 35 | 0.80 | 4.80 | 369.1 |
| | 4 | 100 | 38 | 1.10 | 1.20 | 99.2 |
| | 5 | 80 | 40 | 1.20 | 1.10 | 12.3 |
| | 6 | 120 | 36 | 0.90 | 3.70 | 243.6 |
| | 7 | 180 | 25 | 0.15 | 10.02 | 659.2 |
| | 8 | 160 | 30 | 0.50 | 7.20 | 518.2 |
| | 9 | 150 | 32 | 0.60 | 6.40 | 451.9 |
| | 10 | 150 | 15 | 0.96 | 2.93 | 1025.6 |
| | 11 | 150 | 18 | 0.80 | 0.73 | 752.3 |

TABLE 2-2

Conditions of machine embossing and properties of the polymer films of Comparative Examples 1 to 7

| | | Diameter of embossing roller | Rotational speed of embossing roller | Vmp | Sku | Rsm |
|---|---|---|---|---|---|---|
| | | cm | rpm | µm³/µm² | | µm |
| Comparative Example | 1 | 220 | 22 | 0.13 | 10.38 | 862.7 |
| | 2 | 240 | 20 | 0.10 | 11.28 | 982.4 |
| | 3 | 70 | 50 | 1.40 | 0.68 | 4.7 |
| | 4 | 50 | 52 | 1.50 | 0.52 | 3.4 |
| | 5 | 70 | 30 | 1.40 | 0.67 | 520.4 |
| | 6 | 70 | 35 | 1.50 | 4.80 | 372.1 |
| | 7 | 185 | 35 | 0.80 | 0.58 | 368.4 |

3.3. Manufacture and Property Evaluation of Laminated Glass

Laminated glasses were manufactured using the polymer films of Examples 1 to 11 and Comparative Examples 1 to 7, respectively. First, the polymer film was cut into 300 mm×300 mm. Then, two clean and transparent float glass sheets (length: 300 mm; width: 300 mm; thickness: 2 mm) were provided for each of the polymer films. The 300 mm×300 mm polymer films of Examples 1 to 11 and Comparative Examples 1 to 7 were interposed respectively between two transparent float glass sheets to obtain a laminated object. The laminated object was pre-pressed using evacuation with an airtight bag. The pre-pressing was performed as follows. The laminated object was placed into an airtight bag, and the airtight bag containing the laminated object was kept at a temperature of 30° C. and a degree of vacuum of 700 mmHg for 10 minutes. Next, the airtight bag containing the laminated object was placed into a heating furnace to be kept at a temperature of 140° C. for 40 minutes. Afterward, the airtight bag containing the laminated object was removed from the heating furnace and allowed to cool to room temperature. Then the pre-pressed laminated object was taken out from the airtight bag, placed in an autoclave, and subjected to a hot-pressing with a pressure of 13 bar and a temperature of 135° C. for 120 minutes then cooled to room temperature to obtain the laminated glass.

The polymer films and laminated glasses of Examples 1 to 11 and Comparative Examples 1 to 7 were subjected to the self-adhesion test, bubble residue evaluation, and high-temperature bubble test according to the aforementioned testing methods. The results are listed in Tables 3-1 and 3-2.

TABLE 3-1

Evaluation results of the laminated glasses manufactured using the polymer films of Examples 1 to 11

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Self-adhesion | A | A | A | A | A | A | A | A | A | A | A |
| Bubble residue | ◎ | ◎ | ◎ | ◎ | ◎ | ◎ | ◎ | ◎ | ◎ | ◎ | ◎ |
| High-temperature bubble residue | ◎ | ◎ | ◎ | ◎ | ◎ | ◎ | ◎ | ◎ | ◎ | X | X |

TABLE 3-2

Evaluation results of the laminated glasses manufactured using the polymer films of Comparative Examples 1 to 7

| | Comparative Example | | | | | | |
|---|---|---|---|---|---|---|---|
| | 1 | 2 | 3 | 4 | 5 | 6 | 7 |
| Self-adhesion | B | B | C | C | C | C | C |
| Bubble residue | ◎ | ◎ | ◎ | ◎ | ◎ | ◎ | ◎ |
| High-temperature bubble residue | X | X | ○ | ○ | ◎ | ◎ | ◎ |

As shown in Table 3-1, when the Vmp and Sku values of the polymer film are within the designated ranges, the polymer films of the present invention show excellent results in the self-adhesion test, meaning that the manufacturing process of laminated glass will not be adversely affected by the self-adhesion of the piled polymer films. Meanwhile, the laminated glasses manufactured from the polymer films of the present invention have no bubble defects at the time they are prepared and show excellent results in the high-temperature bubble test, indicating good weatherability. Examples 10 and 11 show that when the Vmp and Sku values of the polymer film are within the designated ranges, but the Rsm value falls outside the preferred range, even if the polymer films can show excellent results in the self-adhesion test and the laminated glasses prepared therefrom can have no bubble defects at the time they are prepared, the laminated glasses cannot have good weatherability (the results in the high-temperature bubble test is poor).

By contrast, as shown in Table 3-2, none of the comparative polymer films shows an excellent result in the self-adhesion test, meaning that the manufacturing process of laminated glass will be adversely affected by the self-adhesion of the piled polymer films. Comparative Examples 1 to 4 show that when none of the Vmp, Sku, and Rsm values of the polymer films is within the designated ranges, the polymer films easily adhere to each other, which is unfavorable for the manufacturing process of laminated glass. Though the laminated glasses of Comparative Examples 1 to 4 have no bubble defects at the time they are prepared, the laminated glasses cannot show satisfactory results in the high-temperature bubble test, indicating poor weatherability. Comparative Examples 5 and 6 show that, when the Vmp value of the polymer film is not within the designated range, even if the Sku and Rsm values of the polymer film are within the designated ranges, the polymer film cannot show excellent results in the self-adhesion test. Comparative Example 7 shows that, when the Sku value of the polymer film is not within the designated range, even the Vmp and Rsm values of the polymer film are within the designated ranges, the polymer film cannot show a satisfactory result in the self-adhesion test.

The above examples are used to illustrate the principle and efficacy of the present invention and show the inventive features thereof, but are not used to limit the scope of the present invention. People skilled in this field may proceed with a variety of modifications and replacements based on the disclosures and suggestions of the invention as described. Therefore, the scope of protection of the present invention is that as defined in the claims as appended.

What is claimed is:

1. A polymer film, which comprises polyvinyl acetal and a plasticizer, wherein the polymer film has a first surface and a second surface, wherein the first surface has a peak material volume (Vmp) at a material ratio of 10% ranging from 0.15 $\mu m^3/\mu m^2$ to 1.20 $\mu m^3/\mu m^2$, and a kurtosis (Sku) ranging from 0.73 to 10.02, wherein the material ratio, peak material volume, and kurtosis are defined in accordance with ISO 25178-2:2012.

2. The polymer film of claim 1, wherein the second surface has a peak material volume (Vmp) at a material ratio of 10% ranging from 0.15 $\mu m^3/\mu m^2$ to 1.20 $\mu m^3/\mu m^2$, and a kurtosis (Sku) ranging from 0.73 to 10.02, wherein the material ratio, peak material volume, and kurtosis are defined in accordance with ISO 25178-2:2012.

3. The polymer film of claim 1, wherein the first surface and the second surface independently have a mean width of profile elements (Rsm) ranging from 10 $\mu m$ to 660 $\mu m$, wherein the mean width of profile elements is defined in accordance with ISO 4287:1997.

4. The polymer film of claim 2, wherein the first surface and the second surface independently have a mean width of profile elements (Rsm) ranging from 10 $\mu m$ to 660 $\mu m$, wherein the mean width of profile elements is defined in accordance with ISO 4287:1997.

5. The polymer film of claim 1, which has a glass transition temperature (Tg) ranging from 5° C. to 23° C.

6. The polymer film of claim 2, which has a glass transition temperature (Tg) ranging from 5° C. to 23° C.

7. The polymer film of claim 1, wherein the polyvinyl acetal is poly(vinyl butyral).

8. The polymer film of claim 2, wherein the polyvinyl acetal is poly(vinyl butyral).

9. The polymer film of claim 1, wherein the polyvinyl acetal has a number average molecular weight (Mn) ranging from 90,000 to 120,000.

10. The polymer film of claim 2, wherein the polyvinyl acetal has a number average molecular weight (Mn) ranging from 90,000 to 120,000.

11. The polymer film of claim 1, wherein based on 100 parts by weight of the polyvinyl acetal, the amount of the plasticizer ranges from 35 parts by weight to 50 parts by weight.

12. The polymer film of claim 2, wherein based on 100 parts by weight of the polyvinyl acetal, the amount of the plasticizer ranges from 35 parts by weight to 50 parts by weight.

13. A laminated glass, which comprises a first glass sheet, a second glass sheet, and an intermediate film disposed between the first glass sheet and the second glass sheet, wherein the intermediate film is provided by the polymer film of claim 1.

14. A laminated glass, which comprises a first glass sheet, a second glass sheet, and an intermediate film disposed between the first glass sheet and the second glass sheet, wherein the intermediate film is provided by the polymer film of claim 2.

* * * * *